(12) United States Patent
Bhaskar et al.

(10) Patent No.: US 12,481,546 B2
(45) Date of Patent: Nov. 25, 2025

(54) SELF-HEALING LOW SPEED SERIAL INTERFACE

(71) Applicant: Intel Corporation, Santa Clara, CA (US)

(72) Inventors: Rajesh Bhaskar, Bangalore (IN); George Vergis, Portland, OR (US); Myron Loewen, Berthoud, CO (US); Matthew A. Schnoor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 17/671,903

(22) Filed: Feb. 15, 2022

(65) Prior Publication Data

US 2022/0171669 A1 Jun. 2, 2022

(51) Int. Cl.
| | |
|---|---|
| G06F 11/00 | (2006.01) |
| G06F 11/07 | (2006.01) |
| G06F 11/14 | (2006.01) |
| G06F 13/16 | (2006.01) |
| G06F 13/42 | (2006.01) |

(52) U.S. Cl.
CPC ...... *G06F 11/0757* (2013.01); *G06F 11/0772* (2013.01); *G06F 11/141* (2013.01); *G06F 13/1668* (2013.01); *G06F 13/4291* (2013.01)

(58) Field of Classification Search
CPC .................................................. G06F 11/0757
See application file for complete search history.

(56) References Cited

U.S. PATENT DOCUMENTS

| | | | | |
|---|---|---|---|---|
| 10,853,289 | B2* | 12/2020 | Srivastava | G06F 13/1673 |
| 2010/0011261 | A1* | 1/2010 | Cagno | G06F 11/1064 |
| | | | | 714/719 |
| 2017/0123884 | A1* | 5/2017 | Lai | G06F 11/0721 |
| 2020/0301598 | A1* | 9/2020 | Yamazaki | G06F 3/0614 |
| 2021/0149758 | A1* | 5/2021 | Kuikka | G05B 9/02 |
| 2022/0012187 | A1 | 1/2022 | Contreras Munoz et al. | |
| 2022/0066855 | A1* | 3/2022 | Park | G06F 11/076 |

(Continued)

OTHER PUBLICATIONS

M. Namjoo and E. J. McCluskey, "Watchdog Processors and Capability Checking," Twenty-Fifth International Symposium on Fault-Tolerant Computing, 1995, 'Highlights from Twenty-Five Years'., Pasadena, CA, USA, 1995, pp. 94-97 (Year: 1995).*

(Continued)

*Primary Examiner* — Bryce P Bonzo
*Assistant Examiner* — Gabriella Kanani Shelton
(74) *Attorney, Agent, or Firm* — Compass IP Law PC

(57) ABSTRACT

An apparatus and method to monitor status of a serial data signal on a low speed serial bus is provided. A controller configures a watchdog timer in each target device, sends a heart-beat command to all of the target devices over the low speed serial bus prior to the expiration of the watchdog timer and issues a broadcast read command to any one of the target devices on the low speed serial bus. A response to the broadcast read command confirms that the low speed serial bus is functional. If a response is not received, the low speed serial bus is not functional and the controller initiates a broadcast reset command to initialize all target devices on the low speed serial bus.

14 Claims, 7 Drawing Sheets

(56) References Cited

U.S. PATENT DOCUMENTS

2024/0281047 A1* 8/2024 Monserrat ............ G06F 13/4027

OTHER PUBLICATIONS

FuturePlus Systems, DDR5 Has A New Sideband Bus, Jul. 27, 2021 (Year: 2021).*
"Specification for I3C Basic", Improved Inter Integrated Circuit, MIPI Alliance, Inc., MIPI Board Adopted Jul. 23, 2021, Public Release Edition, Version 1.1.1, Jun. 9, 2021, 436 pages.
JEDEC Standard, "JEDEC Module Sideband Bus (SidebandBus)", JEDEC Solid State Technology Association, JESD403-1.01 (Editorial revision to JESD403-1, Oct. 2020), Jul. 2021, 56 pages.

* cited by examiner ated with the embodiment is included in at least one embodiment of the present invention. Thus, the appearances of the phrase "in one embodiment" or "an embodiment" in various places throughout this specification are not necessarily all referring to the same embodiment.

SELF-HEALING LOW SPEED SERIAL INTERFACE

FIELD

This disclosure relates to a low speed serial interface on a device and in particular to reliability, accessibility and serviceability of the low speed serial interface.

BACKGROUND

The MIPI Alliance™ Improved Inter Integrated Circuit (I3C) bus can be used to connect devices having a low speed serial interface to a host processor, applications processor or standalone device via a host controller or an Input/Output (I/O) controller.

A memory module is an example of a device that can include a low speed serial interface to connect to the I3C bus. A memory module is a printed circuit board on which memory integrated circuits ("chips") are mounted to another printed circuit board, such as a motherboard, via a connector (also referred to as a "socket"). The connector is installed on the motherboard and a memory module is inserted into the connector. The connector enables interconnection between a memory module and a circuit on the motherboard. A Dual In-line Memory Module (DIMM) has separate electrical contacts on each side of the memory module.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
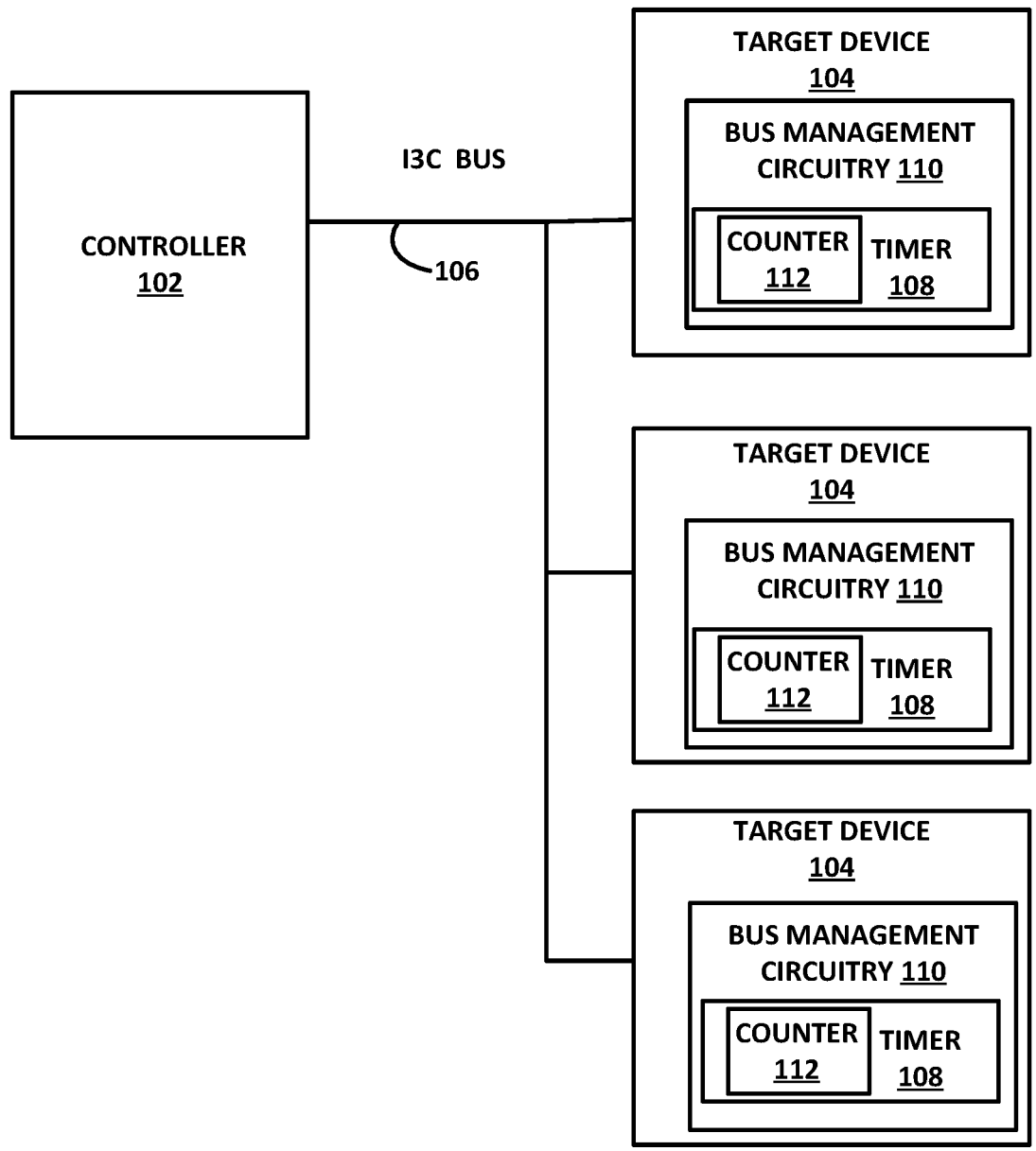
FIG. 1 is a block diagram illustrating a system that includes an I3C bus connecting a controller to a plurality of target devices.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

The MIPI I3C bus is a low speed two wire serial bus that includes two signals (serial clock (SCK) and serial data (SDA)). A controller and at least one target device are connected to the MIPI I3C bus. The controller is capable of controlling the I3C bus. A target device can respond to a direct command or a broadcast command received over the I3C bus from a controller. The controller can communicate over the I3C bus with the target device using the direct command or the broadcast command. A broadcast command is sent to all target devices on the I3C bus. A direct command is directed to a single target on the I3C bus using an address associated with the target.

The SDA signal can be periodically monitored by a host, controller, initiator logic or software using software or hardware based polling during run time to detect if the SDA signal is stuck at a logical '1' or a logical '0'. Bus recovery actions (for example, bus reset) can be taken upon detecting that the SDA signal is stuck.

However, the use of software or hardware based polling to detect if the SDA signal is stuck creates additional overhead to enable and validate and affects bus efficiency through wasted clock cycles used for periodic polling when an error does not exist. In addition, the use of a coarse timer for polling can increase the probability of a bus error propagating to a user visible experience. Furthermore, Bus Reset/Recovery procedures could impact response times of commands, if detected when a command is issued/scheduled.

The use of a watchdog timer in each target device and a heart-beat command periodically transmitted by the controller to the target devices provides a more efficient method to detect if the SDA signal on the I3C bus is stuck. The controller configures a watchdog timer in each target device and sends a heart-beat command to all of the target devices prior to the expiration of the watchdog timer.

Prior to the expiration of the watchdog timer, the controller issues a broadcast read command to any one of the target devices on the I3C bus. A response confirms that the bus is functional. If a response is not received, the bus is not functional, the controller initiates a broadcast I3C Target Reset command to initialize all target devices on the I3C bus.

Each target device on the I3C bus monitors the heart-beat command sent from the controller. If the heart-beat command is not received prior to the expiry of the watch dog timer, the target device can perform a self-reset/healing process and send an optional In-Band Interrupt (IBI) to the controller to indicate successful recovery. While this recovery could be completely transparent to the controller in some devices, the optional IBI can help devices that might lose configuration/state to request re-configuration.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram illustrating a system that includes an I3C bus 106 connecting a controller 102 to a plurality of target devices 104. In an embodiment, the controller 102 can be a Baseband Management Controller (BMC) and the target device 104 can be a serial presence detect (SPD) integrated circuit ("chip") in a memory module. The memory module can be a Dual In-line Memory Module (DIMM). The BMC is a microcontroller embedded on the motherboard of a system that manages the interface between system-management software and platform hardware. Each target 104 has a watchdog timer 108 that can be enabled and set with a value via a command sent over the I3C bus by the controller 102. Bus management circuitry 110 in each target sets the watchdog timer 108 to the value in the command received from the controller 102 and enables/disables the watchdog timer 108. The watchdog timer 108 can run with any clock that is available to the target device 104 that meets the frequency requirements and is available when the target device 104 is expected to be available on the I3C bus. The watchdog timer 108 includes a watchdog expiry counter 112 that can be set with a value via a command sent over the I3C bus by the controller 102.

Data stored in the SPD integrated circuit can include information (attributes) about the memory module including the type of memory integrated chips on the memory module, manufacturer of the memory module, serial number identifiers and timing parameters to be used by a memory controller to access memory integrated chips on the memory module. The information stored in the SPD integrated circuit can be read by a Built In Operating System (BIOS) during power up of a system to configure a memory controller to use the memory integrated circuits on the memory module.

Figure 2:
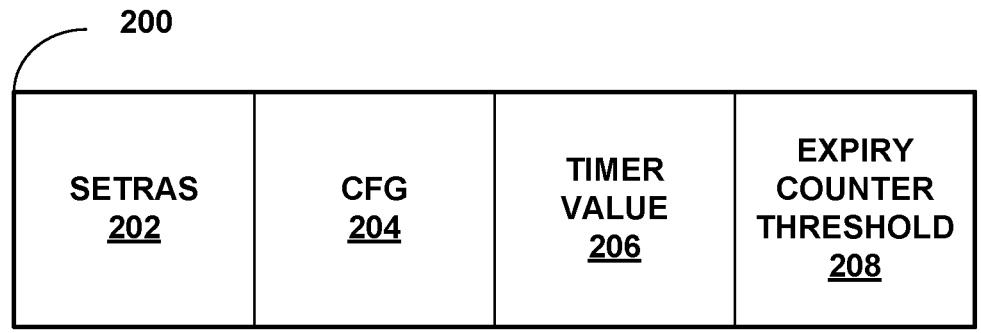
FIG. 2 illustrates the format of a command sent by the controller over the I3C bus to one or more target devices to configure a watchdog timer in the target devices.

FIG. 2 illustrates the format of a SET Reliability, Availability and Serviceability (RAS) (SETRAS) configuration command 200 sent by the controller over the I3C bus to one or more target devices to configure a watchdog timer 108 in the target device 104. The first byte 202 of the SETRAS configuration command 200 (also referred to as a configuration command) identifies the command to be a SETRAS command. The second byte 204 stores the operation (configuration) to be performed by the SETRAS command.

The third byte stores a timer value 206 to be stored in the watchdog timer 108 in the target device 104. If the value is zero, the timer is disabled. If the value is non-zero, the timer is enabled and is initialized with the value. In an embodiment, the watchdog timer 108 is a counter that is initialized with the value and is decremented using a locally available clock. The value represents a number of milli-seconds. On expiry (timer value is decremented to zero), the timer value is reset with the value and starts decrementing. The fourth byte stores an expiry counter threshold 208. The expiry counter threshold 208 can be used by the target device 104 to detect bus failures and self-healing/reset processes that are too frequent. The bus failures and self-healing/reset processes that are too frequent can be reported by the target device 104 to the controller 102 through an In-Band Interrupt.

Figure 3:
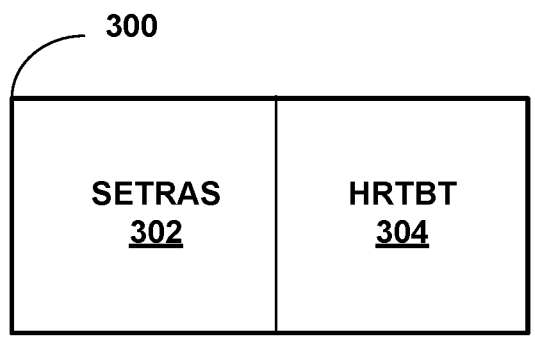
FIG. 3 illustrates the format of a command sent by the controller over the I3C bus to one of the target devices to send a heartbeat to the target device.

FIG. 3 illustrates the format of a SET Reliability, Availability and Serviceability (RAS) (SETRAS) heartbeat broadcast command 300 sent by the controller 102 over the I3C bus 106 to all the target devices 104. The first byte 302 of the SETRAS heartbeat command 300 identifies the command to be a SETRAS command. The second byte 304 stores an indication that this is a heart-beat (HRTBT) to the target devices 104.

Figure 4:
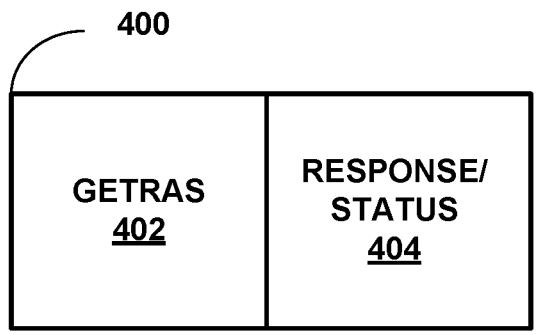
FIG. 4 illustrates the format of a command sent by the controller over the I3C bus to one of the target devices to check status of the SDA signal.

FIG. 4 illustrates the format of a GET Reliability, Availability and Serviceability (RAS) (GETRAS) command 400 sent by the controller over the I3C bus to one of the target devices to check status of the SDA signal. The first byte 402 of the GETRAS command 400 identifies the command to be a GETRAS command 400. If the target device 104 is healthy, the GETRAS command 400 is acknowledged and a response/status byte 404 is sent back to the controller. The response/status byte 404 conveys the status of the target device 104.

Figure 5:
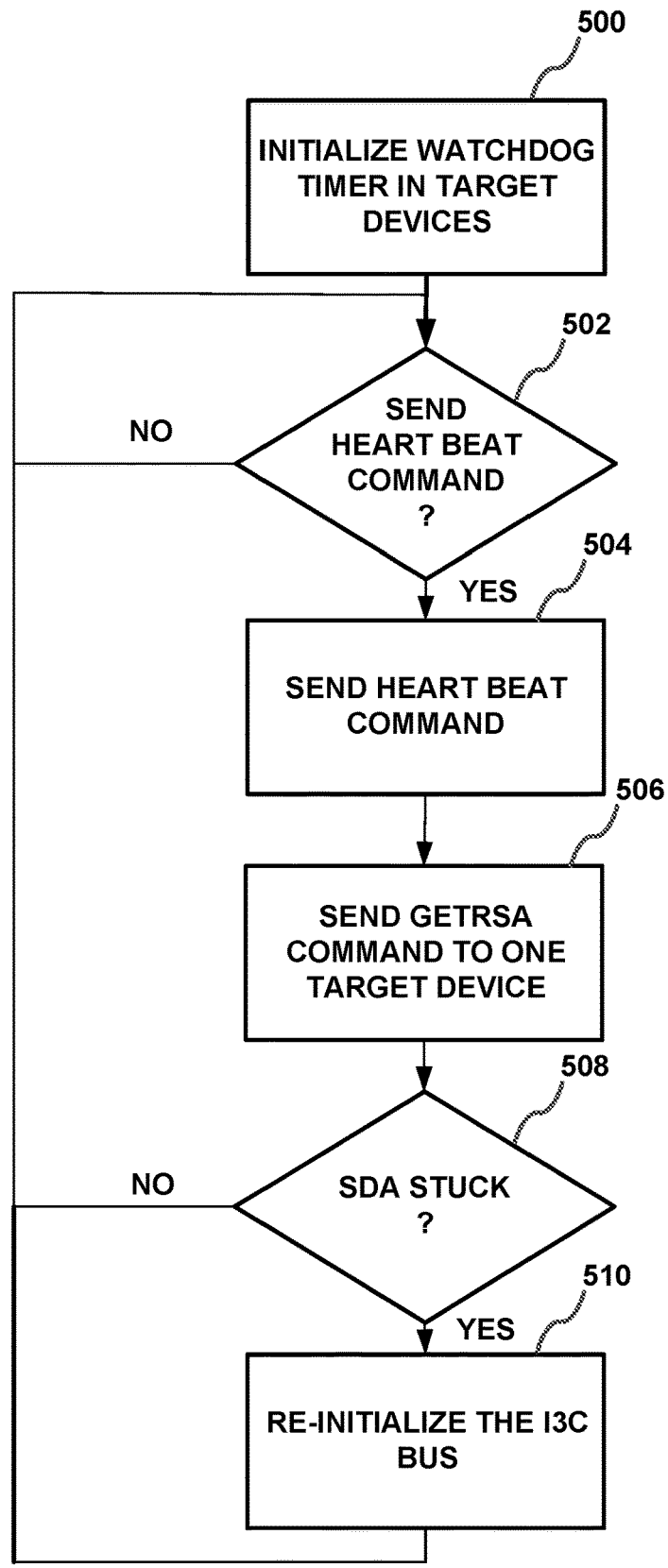
FIG. 5 is a flowgraph illustrating a method performed in the controller to monitor status of the SDA signal.

FIG. 5 is a flowgraph illustrating a method performed in the controller to monitor status of the SDA signal.

At block 500, the controller 102 sends a Unicast SETRAS configuration command 200 to one target device 104 or a broadcast SETRAS configuration command 200 to all target devices connected to the I3C bus 106. The watchdog timer 108 in one or all of the target devices is initialized with the timer value included in the payload of the SETRAS configuration command 200 and the watchdog timer 108 is enabled.

At block 502, the controller 102 determines whether to send a broadcast SETRAS heartbeat command 300 to all target devices 104 at a periodic rate. A heartbeat time period selected to broadcast SETRAS heartbeat command 300 is less than the timer value selected for the watchdog timer 108 so that the watchdog timer 108 does not expire prior to receiving the SETRAS heartbeat command. The heartbeat time period can range from about 25%-50% of the timer value selected for the watchdog timer 108. In an embodiment, the heartbeat time period is about 40% of the timer value selected for the watchdog timer 108 to ensure that missing one SETRAS heartbeat command 300 does not result in an expiry of the watchdog timer 108. Processing continues with block 504, if the elapsed time since the watchdog timer 108 is at the selected percentage of the timer value selected for the watchdog timer 108.

At block 504, the controller 102 sends a broadcast SETRAS heartbeat command 300 to all target devices 104.

At block 506, the controller sends a direct GETRAS command 400 to any single target device 104 connected to the I3C bus 106 using an address associated with the target device 104, after a short delay. Processing continues with block 508.

At block 508, if the data returned in response to the GETRAS command 400 from the target device is ALIVE (for example, 0x55), the SDA signal on the I3C bus 106 is not stuck, processing continues with block 502. If the data returned in response to the GETRAS command 400 from the target device is not ALIVE or no response (I3C NACK) is received, the SDA signal on the I3C bus 106 is stuck, processing continues with block 510.

At block 510, the controller 102 re-initializes the I3C bus 106 using an I3C Reset or a timed-reset. Processing continues with block 502 after re-initialization of the I3C bus 106.

Figure 6:
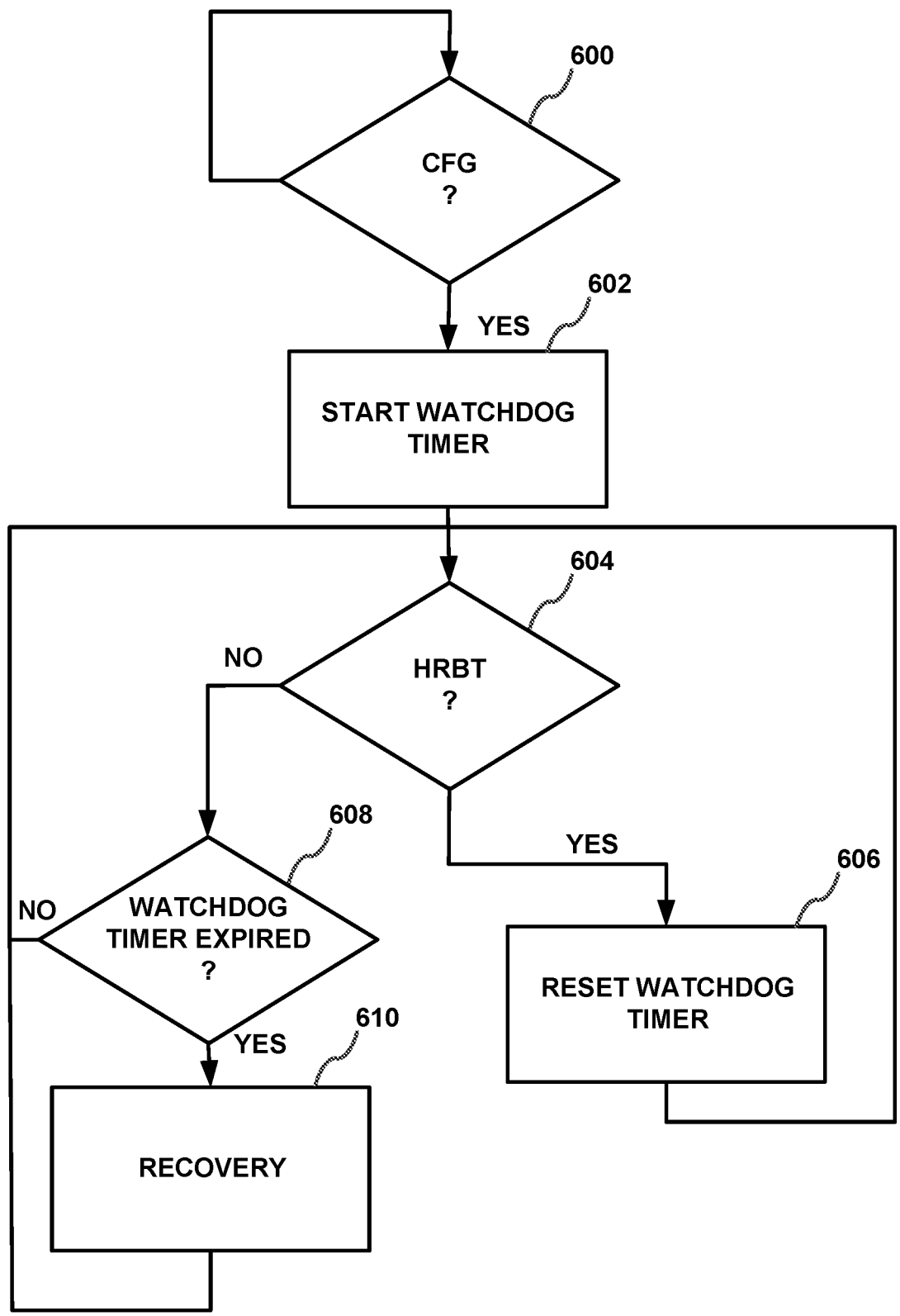
FIG. 6 is a flowgraph illustrating a method performed in the target to provide status of the SDA signal.

FIG. 6 is a flowgraph illustrating a method performed in the target device 104 to provide status of the SDA signal.

At block 600, in response to receiving a SETRAS configuration command 200 on the I3C bus 106 from the controller 10, processing continues with block 602.

At block 602, the bus management circuitry 110 in the target device 104 initializes the watchdog timer 108 with the timer value 206 received in SETRAS configuration command 200 and starts the watchdog timer 108.

At block 604, if the bus management circuitry 110 in the target device 104 receives the SETRAS heartbeat command 300 sent by the controller over the I3C bus 106, processing continues with block 606.

At block 606, in response to receiving the SETRAS heartbeat command 300, the target device resets the watchdog timer 108. Processing continues with block 604 to check for the next SETRAS heartbeat command 300.

At block 608, the target device 104 checks for expiration of the watchdog timer 108. If not expired, processing continues with block 604 to check for the SETRAS heartbeat command 300. If expired, processing continues with block 610.

At block 610, the watchdog timer 108 has expired, the target device 104 can perform self-recovery.

Figure 7:
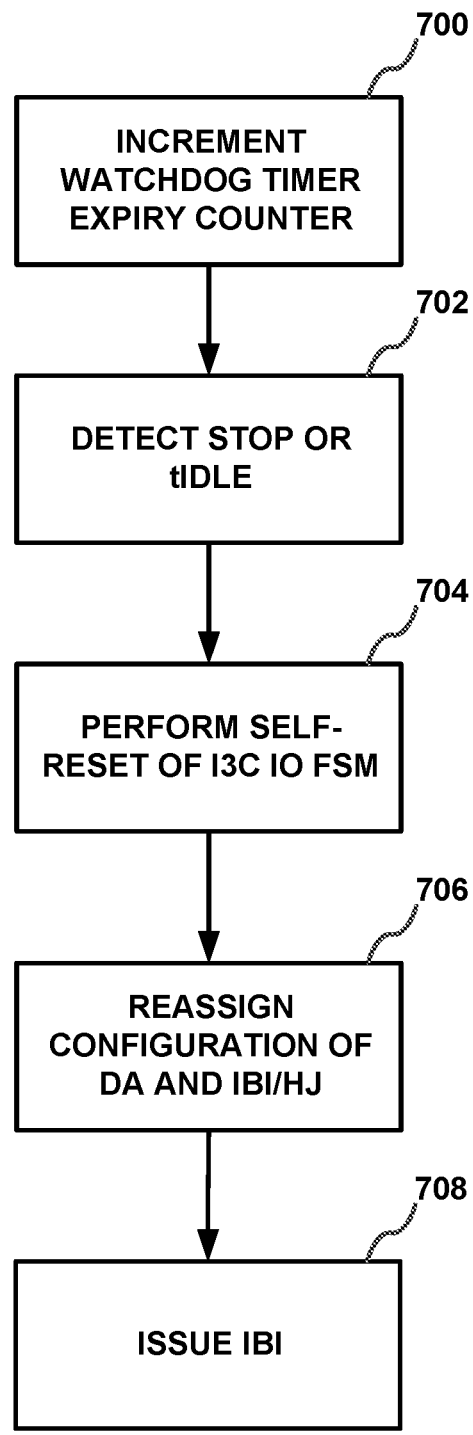
FIG. 7 is a flowgraph illustrating a method performed in the target to perform self-recovery.

FIG. 7 is a flowgraph illustrating a method performed in the target device 104 to perform self-recovery.

At block 700, the target device 104 increments a watchdog expiry counter (WDT_Expiry_Counter)) by one, to track the number of self-recoveries and initiates self-recovery. The WDT_Expiry_Counter is used to track of the health of the I3C bus.

At block 702, the target device 104 detects STOP (a low to high transition on the SDA line while the SCL line remains high) or tIDLE (a time period during which the SDA and SCL lines both sustain a high level).

At block 704, the target device 104 performs self-reset of an I3C Input/Output (IO) Finite State Machine (FSM) in the bus management circuitry 110.

At block 706, the target device 104 re-assigns the previous configuration of Dynamic Address (DA), In Band Interrupt (IBI)/Hot Join (HJ) to ensure that the target device 104 is configured in the I3C mode of operation.

At block 708, when self-recovery is complete and the value of the watchdog expiry counter 112 in the watchdog timer 108 is greater than the expiry counter threshold, if the controller 102 supports an in-band interrupt, the target device 104 issues an in-band interrupt with the mandatory byte set to watchdog timer (informational). If the controller 102 does not support an in-band interrupt, the target device 104 sends a NACK response for all further private transactions. The controller 102 can send a GETSTATUS command to the target device 104 in response to the NACK response to get status of the target device 104 and initiate the recovery process.

The periodic issue of the SETRAS command and the GETRAS command can be implemented using hardware in the controller 102 together with a hardware based mechanism to check if the response for the GETRAS command is GOOD or NACK/BAD. This results in a reduction in the software/firmware overhead for the self-healing interface.

There is minimal software overhead to initiate a bus reset on the I3C bus 106 if the response received by the controller 102 is NACK, which is initiated only when the I3C bus 106 is very unreliable because the self-reset/healing process is not effective.

The probability that the controller 102 receives a NACK response for a GETRAS command is further reduced because the heartbeat command periodically resets the watchdog timer 108 in the target device 104 and the target device 104 can perform self-recovery/healing.

The bus efficiency is increased through the use of periodic SETRAS and GETRAS commands. In an embodiment, the SETRAS command is a 3 byte broadcast command and the GETRAS command is a 3 byte command that is sent to one target device 104 on the I3C bus 106. The overhead is dependent on the value that is selected for the watchdog timer 108. Minimizing the I3C bus 106 reset/down time and reduced software/firmware overhead results in improved response time for all transactions.

Figure 8:
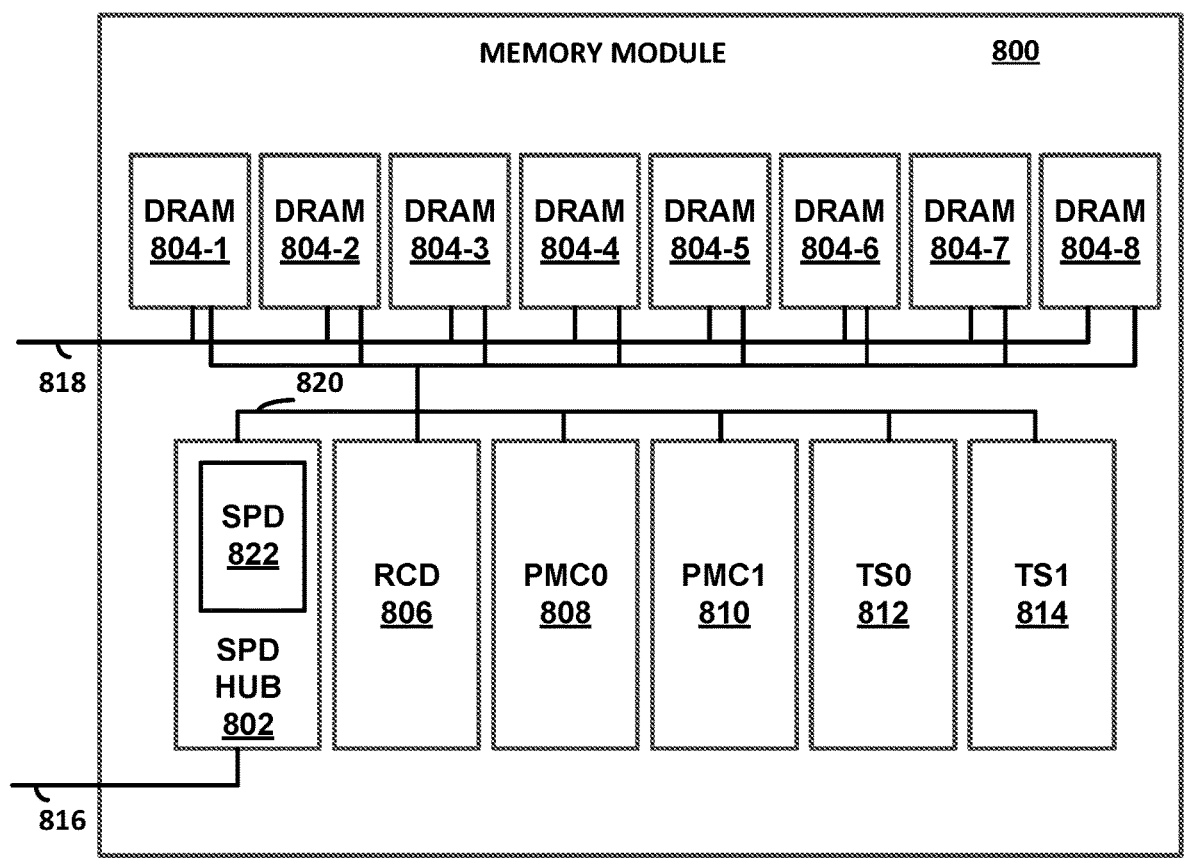
FIG. 8 is a block diagram of a memory module that includes a plurality of Dynamic Random Access Memory (DRAM) chips and an I3C bus target device.

FIG. 8 is a block diagram of a memory module 800 that includes a plurality of Dynamic Random Access Memory (DRAM) chips 804-1, . . . , 804-8 and an I3C bus target device. A host system communicates with the DRAM chips 804-1, 804-2, 804-3, 804-4, 804-5, 804-6, 804-7, 804-8 via a host memory bus, DRAM bus 818.

The memory module 800 communicates with a host system via a sideband bus 816. The sideband bus 816 as described herein may be compatible with the JESD403-1 JEDEC (Joint Electronic Device Engineering Council) Module Sideband Bus standard that is a subset and superset of the MIPI Alliance™ I3C Basic$^{SM}$ serial bus standard, MIPI Alliance™ I3C bus 102 discussed in conjunction with FIGS. 1-7.

The memory module 800 has two temperature sensors (TS), a first temperature sensor TS0 812 and a second temperature sensor TS1 814, to measure the temperature of the DRAM chips 804-1, . . . , 804-8 on the memory module 800. The memory module 800 includes two Power Management ICs (PMICs) (PMC0 808 and PMC1 810), a Registering Clock Driver (RCD) 806, and a Sideband Bus Device Hub (SPD Hub) 802 that includes a Serial Presence Detect (SPD) device 822 which acts as the SPD to redrive the sideband bus 816 to a local bus 820 for the Power Management ICs (PMICs) 808, 810, a Registering Clock Driver (RCD) 806 and the first temperature sensor TS0 812 and the second temperature sensor TS8 814.

The GETRAS command is a directed command and can address one device behind a SPD Hub 802. If the address in a read transaction is for a target device (for example, TS0 812, TS1 814, PMC0 808, PMC1 810 or RCD 806) behind the SPD Hub 802 on local bus 820, the read transaction propagates to the target device on local bus 820. When multiple memory modules 800 are connected to the sideband bus 816, the GETRAS command can be received by SPD Hubs 802 in memory modules 800 which do not propagate the GETRAS because the address in a read transaction is not within the address space of the SPD Hub 802. Instead of propagating the read transaction on the local bus, the SPD Hub 802 spawns a temporary GETRAS in its address space and reports an in-band interrupt to the controller 102 to report an error.

In another embodiment, memory module 800 can include a plurality of non-volatile memory integrated circuits or persistent memory integrated circuits, for example, a three dimensional byte accessible non-volatile memory.

One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

A non-volatile memory (NVM) device is a type of memory whose state is determinate even if power is interrupted to the device. In one embodiment, the NVM device may include block or byte-addressable, write-in-place memories. Examples may include, but are not limited to, single or multi-level Phase Change Memory (PCM) or phase change memory with a switch (PCMS), non-volatile types of memory that include chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of block or byte-addressable, write-in-place memory.

Figure 9:
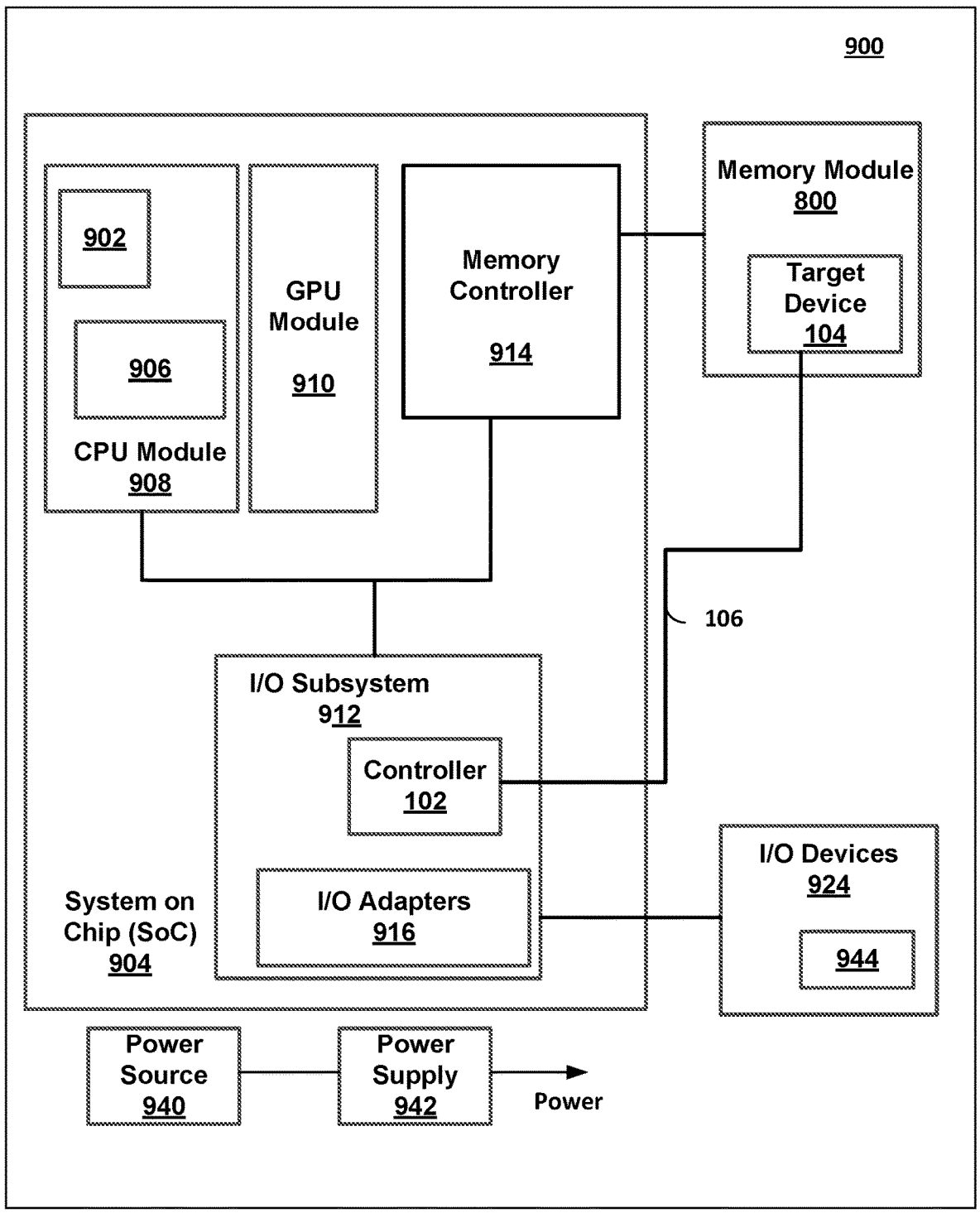
FIG. 9 is a block diagram of an embodiment of a computer system that includes an I3C bus coupled to devices in the computer system including the memory module shown in FIG. 8.

FIG. 9 is a block diagram of an embodiment of a computer system 900 that includes an I3C bus 106 coupled to devices in the computer system 900 including the memory module 800 shown in FIG. 8. Computer system 900 can correspond to a computing device including, but not limited to, a server, a workstation computer, a desktop computer, a laptop computer, and/or a tablet computer.

The computer system 900 includes a system on chip (SOC or SoC) 904 which combines processor, graphics, memory, and Input/Output (I/O) control logic into one SoC package. The SoC 904 includes at least one Central Processing Unit (CPU) module 908, a volatile memory controller 914, and a Graphics Processor Unit (GPU) 910. In other embodiments, the volatile memory controller 914 can be external to the SoC 904. The CPU module 908 includes at least one processor core 902, and a level 2 (L2) cache 906.

Although not shown, each of the processor core(s) 902 can internally include one or more instruction/data caches, execution units, prefetch buffers, instruction queues, branch address calculation units, instruction decoders, floating point units, retirement units, etc. The CPU module 908 can correspond to a single core or a multi-core general purpose processor, such as those provided by Intel® Corporation, according to one embodiment.

The Graphics Processor Unit (GPU) 910 can include one or more GPU cores and a GPU cache which can store graphics related data for the GPU core. The GPU core can internally include one or more execution units and one or more instruction and data caches. Additionally, the Graphics Processor Unit (GPU) 910 can contain other graphics logic units that are not shown in FIG. 9, such as one or more vertex processing units, rasterization units, media processing units, and codecs.

The I/O subsystem 912 can include controller 102 that communicates with target device 104 over the I3C bus 106. Within the I/O subsystem 912, one or more I/O adapter(s) 916 are present to translate a host communication protocol utilized within the processor core(s) 902 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 916 can communicate with external I/O devices 924 which can include, for example, user interface device(s) including a display and/or a touch-screen display 944, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). The display 944 to display data stored in the plurality of memory devices in the memory module 800.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Power source 940 provides power to the components of computer system 900. More specifically, power source 940 typically interfaces to one or multiple power supplies 942 in computer system 900 to provide power to the components of computer system 900. In one example, power supply 942 includes an AC to DC (alternating current to direct current) adapter to plug into a wall outlet. Such AC power can be renewable energy (e.g., solar power) power source 940. In one example, power source 940 includes a DC power source, such as an external AC to DC converter. In one example, power source 940 or power supply 942 includes wireless charging hardware to charge via proximity to a charging field. In one example, power source 940 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable"

form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   a target device to couple to a two wire serial bus, the target device including bus management circuitry to:
   enable a watchdog timer in response to a first command received from a controller on the two wire serial bus,
   reset the watchdog timer in response to a second command received from the controller prior to expiration of the watchdog timer,
   initiate self-recovery if the watchdog timer expires prior to receiving the second command, and
   send an in-band interrupt to the controller to indicate successful recovery.

2. The apparatus of claim 1, wherein the first command is a configuration command.

3. The apparatus of claim 2, wherein the second command is a heart-beat command.

4. The apparatus of claim 1, wherein the two wire serial bus is an Improved Inter Integrated Circuit (I3C) serial bus.

5. The apparatus of claim 1, wherein the apparatus is a memory module.

6. The apparatus of claim 5, wherein the memory module is a Dual In-line Memory Module (DIMM).

7. A system comprising:
   a two wire serial bus;
   a controller coupled to the two wire serial bus; and
   a target device coupled to the two wire serial bus, the target device including bus management circuitry to:
   enable a watchdog timer in response to a first command received from the controller on the two wire serial bus,
   reset the watchdog timer in response to a second command received from the controller prior to expiration of the watchdog timer,
   initiate self-recovery if the watchdog timer expires prior to receiving the second command, and
   send an in-band interrupt to the controller to indicate successful recovery.

8. The system of claim 7, wherein the first command is a configuration command.

9. The system of claim 8, wherein the second command is a heart-beat command.

10. The system of claim 7, wherein the two wire serial bus is an Improved Inter Integrated Circuit (I3C) serial bus.

11. The system of claim 7, further comprising one or more of:
    a display communicatively coupled to at least one processor; or
    a power supply to provide power to the system.

12. A method comprising:
    receive, by a target device over a two wire serial bus, a first command from a controller;
    enable a watchdog timer in the target device, in response to the first command;
    reset, by the target device, the watchdog timer in response to a second command received from the controller prior to expiration of the watchdog timer;
    initiate self-recovery, by the target device, if the watchdog timer expires prior to receiving the second command; and
    send, by the target device, an in-band interrupt to the controller to indicate successful recovery.

13. The method of claim 12, wherein the first command is a configuration command and the second command is a heart-beat command.

14. The method of claim 12, wherein the two wire serial bus is an Improved Inter Integrated Circuit (I3C) serial bus.

* * * * *